United States Patent [19]

Iwasaki

[11] Patent Number: 5,384,552
[45] Date of Patent: Jan. 24, 1995

[54] CLOCK RECOVERY CIRCUIT FOR EXTRACTING CLOCK INFORMATION FROM A RECEIVED BASEBAND SIGNAL

[75] Inventor: Motoya Iwasaki, Tokyo, Japan
[73] Assignee: NEC Corporation, Tokyo, Japan
[21] Appl. No.: 157,698
[22] Filed: Nov. 24, 1993

[30] Foreign Application Priority Data

Nov. 25, 1992 [JP] Japan ............................... 4-314469

[51] Int. Cl.$^6$ ........................................... H03L 7/00
[52] U.S. Cl. ...................................... 331/25; 331/14; 375/120
[58] Field of Search ........................... 331/1 A, 14, 25; 329/302, 303, 307, 309; 375/120

[56] References Cited

U.S. PATENT DOCUMENTS 4,595,992  6/1986  Drogin ................................ 364/569

FOREIGN PATENT DOCUMENTS 0092400  10/1983  Europe .

OTHER PUBLICATIONS

B.W. Maples et al. "Rapid Clock Recovery Technique with Monotonic Phase Error Metric" IEEE Military Communications Conference, pages 141–145, Vol. 1, Sept. 30, 1990, Montery (CA).

European Patent Office Communication dated August 2, 1994.

*Primary Examiner*—Robert J. Pascal
*Assistant Examiner*—David Hung Vu
*Attorney, Agent, or Firm*—Ostrolenk, Faber, Gerb & Soffen

[57] ABSTRACT

In a clock recovery circuit, an asynchronous oscillator generates a first clock pulse at a frequency n times the frequency of a baseband signal. A sampler samples the baseband signal in response to the first clock pulses. A flip-flop holds and delivers the sampled signal in response to a second clock pulse supplied from a voltage-controlled oscillator. The time difference between the first clock pulse and the second clock pulse is detected and a set of tap-gain values is selected according to the time difference. The sample delivered from the flip-flop is successively delayed by a tapped delay line to produce tap signals which are respectively weighted with the selected tap-gain values. The weighted samples are summed to estimate an intermediate sample. A clock phase error of the estimated sample with respect to the clock timing of the transmitted signal is determined for controlling the VCO.

4 Claims, 1 Drawing Sheet

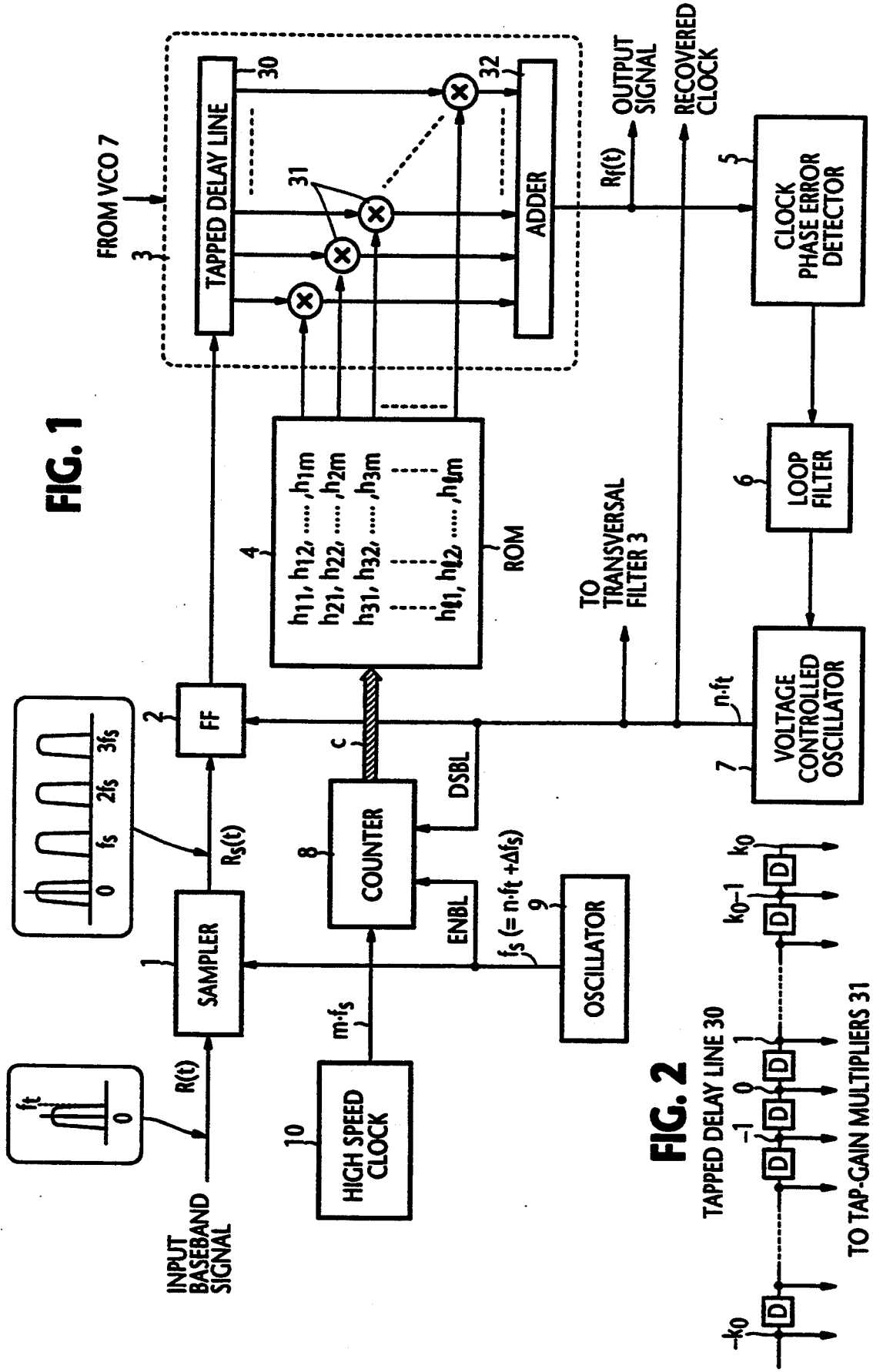

CLOCK RECOVERY CIRCUIT FOR EXTRACTING CLOCK INFORMATION FROM A RECEIVED BASEBAND SIGNAL

BACKGROUND OF THE INVENTION

1. Field of the Invention

The present invention relates to a clock recovery circuit for extracting clock information from a received baseband signal.

2. Description of the Related Art

In a known clock recovery circuit, a received baseband signal is sampled by an analog-to-digital converter. A clock phase error of the sampled signal with respect to the clock timing of the transmitted signal is estimated and filtered to remove the high frequency components contained in the phase error for controlling the voltage-controlled oscillator that generates the sampling clock so that the phase error is reduced to zero. Since the usual practice is to use a low-cost, high resolution A/D converter, the sampling clock frequency must be several hundreds times the frequency of the received signal. However, controlling the VCO at such a high sampling frequency cannot simply be achieved as in the case of low sampling frequency in which high frequency sampling pulses from a separate clock source are adaptively divided by the use of a variable frequency divider. Therefore, a price limitation is placed on the known clock recovery circuit. According to another known technique, an asynchronous oscillator is used to sample the baseband signal. The sampled baseband signal is applied to an interpolation filter for estimating optimum sample value from which clock timing is extracted. Optimum clock timing is said to be detected when the phase difference between the input of the filter and the estimated sample is reduced to zero. However, it is difficult to precisely match the estimated timing with the clock timing of the transmitted signal.

SUMMARY OF THE INVENTION

It is therefore an object of the present invention to provide a low-cost clock recovery circuit with simplified digital circuitry.

The clock recovery circuit of the present invention comprises an asynchronous oscillator for generating first clock pulses at a frequency n times the frequency of a baseband signal, where n is an integer greater than unity. A sampler is provided for sampling the baseband signal in response to the first clock pulse to produce a first sample. The first sample is held and delivered as a second sample in response to a second clock pulse supplied from a voltage-controlled oscillator. The time difference between the first and second clock pulses is detected and a set of tap-gain values is selected according to the time difference. To estimate an optimum intermediate sample, a transversal filter is provided for successively delaying the second samples, respectively weighting the successively delayed samples with the tap-gain values, and producing an output signal representative of a sum of the weighted samples as representative of the estimate of the intermediate sample. A clock phase error of the intermediate sample with respect to the clock timing of the transmitted signal is detected and the voltage-controlled oscillator is controlled in accordance with the detected clock phase error. When the clock phase error is reduced to zero, an optimum intermediate sample value is obtained and the output of the voltage-controlled oscillator is controlled to the clock timing of the transmitted signal.

BRIEF DESCRIPTION OF THE DRAWINGS

The present invention will be described in further detail with reference to the accompanying drawings, in which:

FIG. 1 is a block diagram of a clock recovery circuit according to the present invention; and FIG. 2 is a circuit diagram of a tapped delay line of the transversal filter used in FIG. 1.

DETAILED DESCRIPTION

Referring now to FIG. 1, there is shown a clock recovery circuit for a digital radio receiver according to the present invention. An original baseband signal at frequency $f_t$ is modulated on a carrier and sent from a transmit site. At the receive site, the modulated carrier is demodulated to recover the original baseband signal $R(t)$. The baseband signal $R(t)$ is applied to a sampler 1 where it is sampled in response to the output of an asynchronous, or self-running oscillator 9 at frequency $f_s$ (which is equal to $n.f_t$ where $n=4$) to produce a sampled baseband signal $R_s(t)$. In a preferred embodiment, the sampler 1 is implemented by an analog-to-digital converter. Since the oscillator 9 is not synchronized with the clock (symbol) timing of the transmitted baseband signal, the sampling frequency $f_s$ is equal to $n \cdot f_t + \Delta f_s$, where $\Delta f_s$ is the frequency error. The sampled baseband signal $R_s(t)$ is a discrete signal that contains aliasing components at frequencies $f_s$, $2f_s$ and $3f_s$. The signal $R_s(t)$ is represented as follows:

$$R_s(t) = R(t)\delta(t - k/f_s) = R_k\delta(t - k/f_s) \qquad (1)$$

where $\delta(t)$ is the delta function which is 1 for $t=0$ and 0 at other times, k is an arbitrary integer, and $k/f_s$ represents the instant "t" at which the signal $R(t)$ is sampled by sampler 1, and $R_k = R(t) = R(k/f_s)$.

The sampled signal $R_s(t)$ is applied to a flip-flop 2 where each of the samples $R_s(t)$ is held and delivered from the flip-flop when the latter is supplied with a clock pulse from a voltage-controlled oscillator 7. The VCO 7 is precisely controlled at frequency $n.f_t$ through a closed loop operation to be described. The output of the flip-flop 2 is applied to a transversal filter 3 for estimating an optimum sample which is located between the successive samples initially produced by the sampler 1.

Transversal filter 3 comprises a tapped delay line 30, a plurality of tap-gain multipliers 31 connected to the successive taps of the delay line 30, and an adder 32. Tapped-delay line 30 includes a series of delay elements D (see FIG. 2) which are driven at frequency $1/n.f_t$ by clock pulses supplied from the VCO 7 and receive samples from flip-flop 2 to produce tap signals at successive taps of the delay line, each tap signal being delayed a unit delay time $1/n.f_t$. The tap-gain multipliers 31 operate on the respective tap signals by using tap-gain (or tap-weight) values $h_{ij}$ (where $i=1, 2, \ldots, l$, $j=1, 2, \ldots, m$) stored in a read-only memory 4. These tap-gain values represent the impulse response of the transversal filter 3. In response to an input signal supplied from a counter 8, tap-gain values $h_{1j}, h_{2j}, \ldots, h_{lj}$ are read out of the memory 4 and applied to the tap-gain multipliers 31, respectively, where they are weighted with the respective tap-gain values. The outputs of the tap-gain multipliers 31 are summed by adder 32 to produce an output signal $R_f(t)$ of the transversal filter 3.

A clock phase error detector 5 is connected to the output of transversal filter 3 for estimating a phase error of the clock timing of signal $R_f(t)$ with respect to the clock timing of the transmitted signal in a manner as described in a paper "Development of Variable-Rate Digital Modem for Digital Satellite Communication Systems", Susumu Otani et al, (CH2535-3/88/0000-0148, 1988, IEEE). A loop filter 6 removes the high frequency components of the phase difference signal and supplies a frequency control voltage to the VCO 7.

The counter 8 is supplied with a high-speed clock pulse at frequency $m.f_s$ from a clock source 10. The counter 8 is enabled in response to a clock pulse from asynchronous oscillator 9 to initiate counting the high-speed clock pulse and terminates the count operation in response to a clock pulse from the VCO 7 to produce a count value "C". The count value "C" is equal to $m.f_s \Delta t$, where $\Delta t$ is the time difference between the time $k/f_s$ at which the baseband signal R(t) is sampled by sampler 1 and the clock timing of the VCO 7, which will be eventually made to coincide with the clock timing of the transmitted signal. In response to a count value "C", a set of "l" tap-gain values $h_{ij}$ is selected from the stored "m" sets of tap-gain values and supplied from the ROM 4 to the tap-gain multipliers 31 of the transversal filter, respectively.

Since the transversal filter provides convolution integral, the output signal $R_f(t)$ of the transversal filter 3 is represented as:

$$R_f(t) = \int_{-\infty}^{\infty} R_S(t - \tau)h(\tau)d\tau \quad (2)$$

$$= \int_{-\infty}^{\infty} R(t - \tau)\delta(t - \tau - k/f_S)h(\tau)d\tau$$

$$= \sum_{k=-\infty}^{\infty} R_k \cdot h(t - k/f_S)$$

where $\tau$ is the time variable, or excitation time, t is the response time, and h(t) is the impulse response of the transversal filter 3 (see An Introduction to Analog and Digital Communications, John Wiley & Sons, Simon Haykin, pages 84 to 87). Since the convolutional integration is theoretically performed between $k = -\infty$ and $k = \infty$, Equation (2) can be written as:

$$R_f(t) = \sum_{k=-\infty}^{\infty} R_k \cdot h(k/f_S + \Delta t) \quad (3)$$

Since the impulse response h(t) decreases as "t" increases, it is sufficient for the transversal filter 3 to provide convolutional integration over a range of finite values $\pm k_o$ (where a suitable value of $k_o$ is 10), and Equation (3) becomes:

$$R_f(t) = \sum_{k=-k_0}^{k_0} R_k \cdot h_k(\Delta t) \quad (4)$$

where $h_k(\Delta t) = h(k/f_s + \Delta t)$. Since the impulse response of the transversal filter 3 can be made to vary as a function of the time difference $\Delta t$, the tap-gain values $h_k(\Delta t)$ stored in memory 4 are determined so that an optimum sample is obtained when the clock phase error detected by phase error detector 5 is reduced to zero. For example, if a time difference $\Delta t_l$ exists between the sample time $k/f_s$ and the clock timing of VCO 7, the closed loop of the clock recovery circuit hunts for a set of optimal impulse responses until the phase error is reduced to zero. When this occurs, a set of tap-gain values $h_{l1}, h_{l2}, \ldots h_{1l}$ is read out of the ROM 4 into the transversal filter 3 and an appropriate intermediate sample value is obtained and the output of the VCO 7 is precisely controlled to the clock timing of the transmitted signal and delivered from the clock recovery circuit as a clock timing of the receiver.

What is claimed is:

1. A clock recovery circuit, comprising:

an asynchronous oscillator for generating first clock pulses at a frequency n times the frequency of a baseband signal, where n is an integer greater than unity;

sampler means for sampling said baseband signal in response to said first clock pulses and producing first samples;

a voltage-controlled oscillator for producing second clock pulses at a controlled frequency;

latch means for holding said first samples and delivering the held first samples in response to said second clock pulses as second samples;

time difference detector means for detecting a time difference between said first clock pulses and said second clock pulses;

means for producing a set of tap-gain values in response to said time difference;

a transversal filter for successively delaying said second samples, weighting the successively delayed second samples with said tap-gain values respectively, and producing an output signal representative of a sum of the weighted second samples; and clock phase error detector means for detecting a phase error of the output signal of said transversal filter with respect to the clock timing of the received baseband signal and controlling said voltage-controlled oscillator according to the detected clock phase error.

2. A method for recovering transmitted clock pulses from a received baseband signal, using an asynchronous oscillator which produces first clock pulses at a frequency n times the frequency of a baseband signal, where n is an integer greater than unity, and a voltage-controlled oscillator which produces second clock pulses at a controlled frequency, comprising the steps of:

a) sampling said baseband signal in response to said first clock pulses and producing first samples;

b) holding said first samples and delivering the held first samples in response to said second clock pulses as second samples;

c) detecting a time difference between said first clock pulses and said second clock pulses;

d) generating a set of tap-gain values in response to said time difference;

e) successively delaying said second samples;

f) respectively weighting the successively delayed second samples with the tap-gain values generated by the step (d);

g) summing the weighted second samples; and h) detecting a clock phase error of the second samples summed by the step (g) with respect to the clock timing of the received baseband signal and controlling said voltage-controlled oscillator with the detected clock phase error.

3. A method as claimed in claim 2, wherein the step (d) comprises:
   d1) storing m sets of tap-gain values into a memory;
   d2) generating third clock pulses at a frequency m times the frequency of the first clock pulses; and
   d3) counting said third clock pulses to increment a count value in response to each of said first clock pulses and maintaining said count value as representative of said time difference in response to one of said second clock pulses,
   wherein the step (f) comprises reading one of said m sets of tap-gain values from said memory in response to the maintained count value to respectively weight the successively delayed second samples with the tap-gain values of the read set.

4. A clock recovery circuit as claimed in claim 1, wherein said means for producing a set of tap-gain values comprises a memory for storing m sets of tap-gain values, and wherein said time difference detector means comprises:
   means for generating third clock pulses to increment a count value and responsive to one of said second clock pulses for maintaining said count value as representative of said time difference and reading one of said m sets of tap-gain values from said memory in response to the maintained count value and applying the read set of tap-gain values to said transversal filter.

* * * * *